N. R. MARTIN & C. E. ROBY.
SPRING WHEEL.
APPLICATION FILED MAY 13, 1911.
1,024,091.
Patented Apr. 23, 1912.
2 SHEETS—SHEET 1.
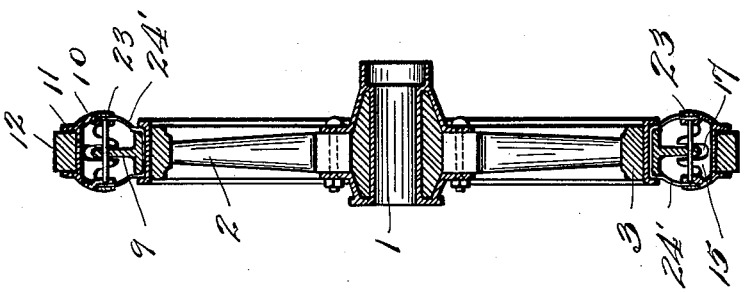
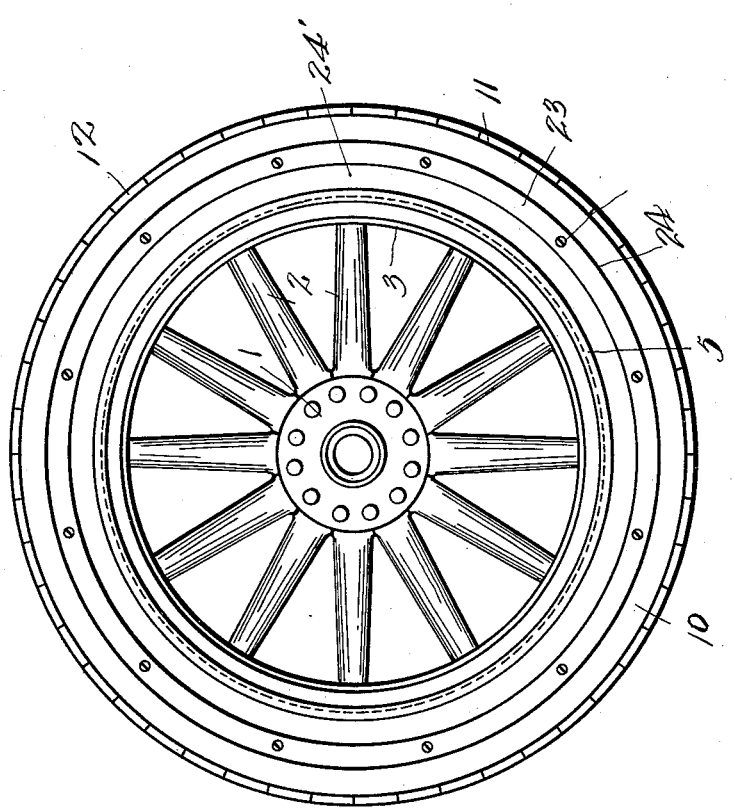
WITNESSES:
C. M. Shigley
M. G. Harney
INVENTORS
NOAH R. MARTIN
CLAYTON E. ROBY
BY
Thomas R. Harney
ATTORNEY.

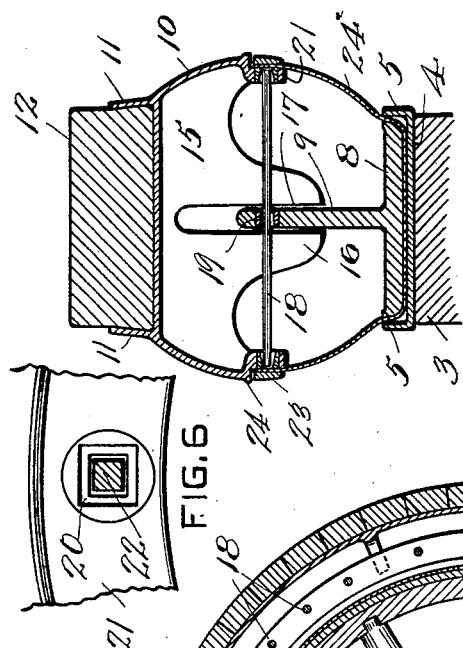
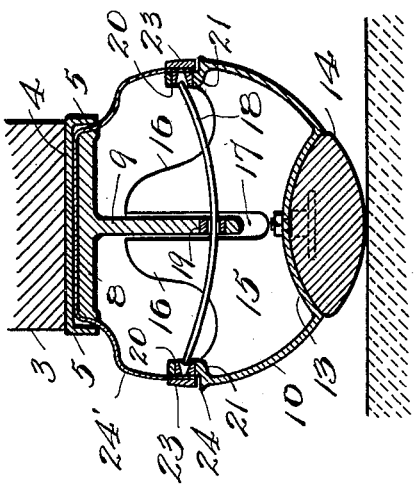
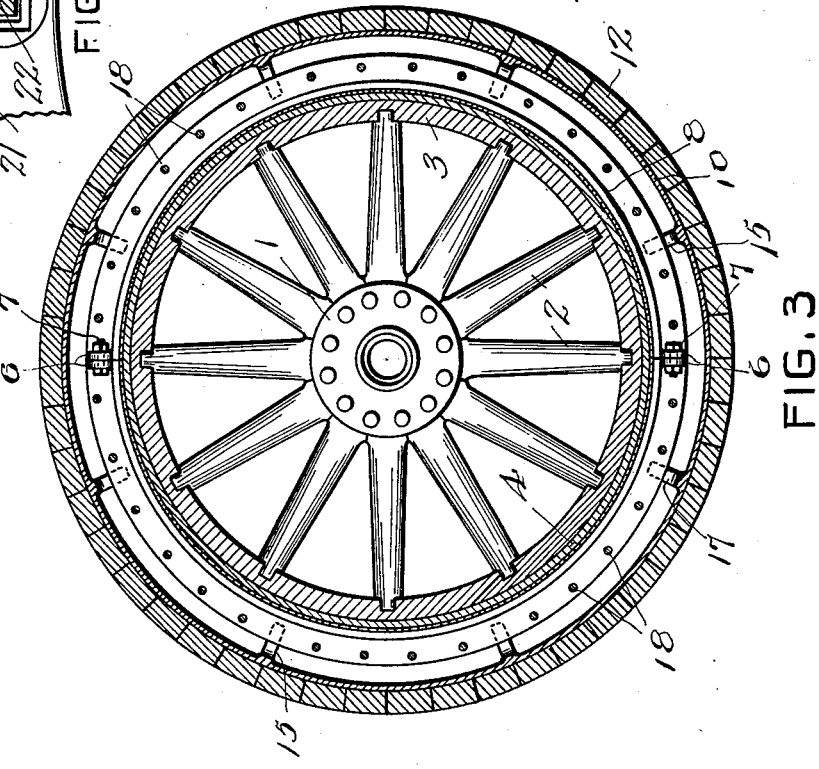

UNITED STATES PATENT OFFICE.

NOAH R. MARTIN AND CLAYTON E. ROBY, OF COLUMBUS, OHIO.

SPRING-WHEEL.

1,024,091.  Specification of Letters Patent. Patented Apr. 23, 1912.

Application filed May 13, 1911. Serial No. 626,965.

*To all whom it may concern:*

Be it known that we, NOAH R. MARTIN and CLAYTON E. ROBY, citizens of the United States, residing at Columbus, in the county of Franklin and State of Ohio, have invented certain new and useful Improvements in Spring-Wheels, of which the following is a specification.

The present invention relates to improvements in spring wheels, and is especially applied to an improved construction of resilient rims for such wheels.

The object of the invention is the provision of a novel form of rim, which is applicable to wheels of standard make, for converting the wheel into a spring wheel or resilient wheel, which is capable of absorbing the shocks sustained in use, and reducing the wear upon the supported vehicle, such as an automobile.

The invention consists essentially of a two part rim having flexible connections between the parts, comprising transversely arranged spring rods, and in certain other novel features of construction and combinations and arrangements of parts constituting a complete and efficient construction for the purpose intended.

In the accompanying drawings we have illustrated one example of the physical embodiment of our invention, and a minor modification thereof, constructed according to the best mode we have so far devised for the practical application of the principles.

Figure 1 is a side elevation of a wheel embodying the invention. Fig. 2 is a vertical transverse section of Fig. 1. Fig. 3 is a vertical longitudinal sectional view. Fig. 4 is a transverse sectional view of the rim, on an enlarged scale, with parts extended. Fig. 5 is a similar view, with the parts compressed, as under a load, and showing a different form of tire. Fig. 6 is a fragmentary view, further enlarged, showing a bearing block and the squared end of a spring rod therein.

In the preferred embodiment of our invention we employ any wheel of standard make, as illustrated in the drawings and comprising the hub portion 1, spokes 2, and felly 3. Upon the felly 3 is placed the metallic ring 4, preferably of channel iron, and formed with side annular flanges 5, 5. Within the channel of the ring 4 is retained the inner section of our improved rim. As clearly seen in Fig. 3, this inner section or member comprises jointed portions which are formed with ears 6, 6, and secured together by means of bolts 7, 7. The number of pieces or sections of the inner member may be determined by the requirements under different circumstances, but for convenience we have illustrated only two joints.

The inner member of the rim, as shown in Figs. 4 and 5, is fashioned with a base ring 8 and a central flange 9, the base being seated in the channel between the flanges 5, 5 of the metallic ring 4. The outer member of our improved rim, as designated at 10, is of metal comprising a hemi-spherical hollow body, and in the preferred form, is formed with outer annular flanges 11, 11, for the purpose of retaining the blocks 12 of the tire or tread of the wheel. (See Fig. 4.) In Fig. 5, the periphery of the member 10 is depressed, as at 13 to form a seat for the tire 14, which is shown as elliptical in form. At predetermined intervals about the inner side of the outer member 10 are arranged integral, transverse, ribs or partitions 15, formed with extensions 16 to increase the length of a slot 17, located in the center of each rib. These slots are for the reception of the central flange 9 of the inner member of the rim, and allow for a relative movement of the parts of the rim.

The inner and outer members of the rim are flexibly, and resiliently connected by means of a series of spring metallic rods 18 arranged transversely of the wheel. These spring rods are passed through openings in the flange 9, there being a perforated wear block 19 located in the flange for each rod, and the ends of the rods are seated in wear blocks 20, the latter being located in openings arranged in the inset flanges 21 of the outer member. As clearly seen in Fig. 6, one of the end wear blocks 20 is formed with a squared opening to receive the squared end 22 of the rod. This construction is provided to guard against turning of the rods, so that should the rods become "set" in the position shown in Fig. 5, when the load is removed, the rod will be pulled back into normal or straight position.

The wear blocks 20, and rods or bars 18 are held against lateral displacement by means of the rings or bands 23, located one at either side of the rim and seated against the shoulders 24 on the outer member. The rings or bands are secured to the flanges 21 by means of screws or other devices. These bands or rings also serve to hold one portion of a covering 24' to the outer member of the rim, and the covering is held to the inner member by locating its central portion within the channel of the metallic ring between said ring and the base 8 of the inner rim section. This covering is preferably of flexible, waterproof, dustproof, and greaseproof material, and in conjunction with the outer section of the rim, forms an inclosed space in which a lubricant may be inclosed, to insure lubrication of the three bearing points of the spring rods. The covering is also a protection against, pebbles, dirt, dust, etc., which would otherwise interfere with the proper movement of the parts.

From the above description taken in connection with the drawings, it is believed the merits and advantages of our improved wheel construction will be apparent.

When sufficient load is placed upon the wheel, all the rods are depressed, as in Fig. 5 and the shock of movement is absorbed by the elasticity of the spring rods. Side thrust of the wheel is taken up by the ribs of the outer section of the rim, and the slotted ribs guide the movement of the flange of the inner section of the rim.

It will be understood that our improved rim may be applied to wheels of standard make, and size, and the number of spring rods may be varied to furnish different degrees of flexibility required for different purposes. As each one of the spring rods throughout the rim receives its part of the load, the shock is thus absorbed at the rim and is prevented from passing to the hub.

Having thus fully described our invention, what we claim as new and desire to secure by Letters Patent is:—

1. A wheel rim comprising inner and outer members, an annular perforated flange on the inner member, a series of transversely arranged slotted guide partitions disposed about the outer section and projecting over said flange, and axially arranged spring rods seated in said rib with their ends loosely connected to said outer member.

2. A wheel rim comprising inner and outer members, an annular perforated flange on the inner member, a series of transversely arranged integral slotted guide partitions disposed about the outer section projecting over said flange, a flexible member secured to the outer and inner members providing an inclosed lubricating space, and axially arranged metallic spring rods seated in said rib having their ends loosely connected to the outer member.

3. The combination with a wheel felly, of a wheel rim comprising an inner section formed with a base and an annular perforated flange, an outer section provided with a series of integral slotted transversely arranged partitions projecting over said flange, and axially arranged elastic rods seated in said flange and loosely connected to the outer member.

4. A wheel rim including an inner section formed with a base and an annular perforated flange, an outer section having a series of transversely arranged integral, slotted partitions projecting over said flange, and axially arranged metallic rods retained in said flange having their ends engaging recessed blocks in said outer section.

5. An inner rim including an inner section formed with a base and an annular perforated flange, an outer section having transversely arranged integral, slotted ribs projecting over said flange, oppositely disposed bearing blocks having tapered recesses in said outer section, perforated bearing blocks in the perforated flange, and a series of axially arranged spring rods seated in the tapered recesses and passed through said perforated blocks.

In testimony whereof we affix our signatures in presence of two witnesses.

NOAH R. MARTIN.
CLAYTON E. ROBY.

Witnesses:
C. M. SHIGLEY,
H. H. HILDRED.

---

Copies of this patent may be obtained for five cents each, by addressing the "Commissioner of Patents, Washington, D. C."